United States Patent [19]
Nashiki et al.

[11] Patent Number: 5,896,019
[45] Date of Patent: Apr. 20, 1999

[54] MOTOR CONTROL DEVICE

[75] Inventors: Masayuki Nashiki; Takanori Yokochi, both of Niwa-gun, Japan

[73] Assignee: Okuma Corporation, Nagoya, Japan

[21] Appl. No.: 08/996,216

[22] Filed: Dec. 22, 1997

[30] Foreign Application Priority Data

Dec. 25, 1996 [JP] Japan ................. 8-345500

[51] Int. Cl.$^6$ ................. H02P 5/00; H02P 5/40
[52] U.S. Cl. ................. 318/701; 318/254; 318/757; 318/727; 318/138
[58] Field of Search ................. 318/138, 245, 318/254, 439, 701–799

[56] References Cited

U.S. PATENT DOCUMENTS

| | | | |
|---|---|---|---|
| 4,572,951 | 2/1986 | Toda et al. | 250/231 SE |
| 5,075,610 | 12/1991 | Harris | 318/701 |
| 5,294,856 | 3/1994 | Horst | 310/181 |
| 5,313,149 | 5/1994 | Bahn | 318/727 |
| 5,652,493 | 7/1997 | Hendershot, Jr. | 318/138 |

*Primary Examiner*—Paul Ip
*Attorney, Agent, or Firm*—Oliff & Berridge, PLC

[57] ABSTRACT

A motor control device that can control the rotational direction of a rotor with polarity in an initial position detection. The motor control device includes first metering voltage signal generating system for sequentially creating 2N-phase signals to an N-phase motor, current metering system for measuring stator winding current, and first rotational position arithmetic system for detecting an absolute rotational position corresponding to an electrical angle of 180° based on the measured current.

4 Claims, 15 Drawing Sheets

1

MOTOR CONTROL DEVICE

BACKGROUND OF THE INVENTION

1. Field of the Invention

The present invention relates to a motor control device that detects position of the rotor of a motor and then controls the position and the speed thereof.

2. Description of the Related Art

In order to run a motor, the motor control device usually detects the rotational position of the rotor by a rotational position sensing device and energizes the stator winding thereof with the current which controls the position or velocity of the rotor thereof at a desired value. FIGS. 9 and 10 illustrate conventional motor control. The power transistor 5 shown in FIGS. 9 and 10 is illustrated in FIG. 11. The rotor 3 is illustrated in FIG. 12. Referring to FIG. 11, the power transistor 5 is equivalent to the so-called transistor inverter. In this example, the inverter is formed of six transistors 22 and six diodes 23, and a power source 21. The operation and function of the transistors 22 and the diodes 23 are well known. Hence the explanation will be omitted here. The motor is controlled by adjusting the current flowing through the rotor windings 28 of a motor. In order to control of the motor by the power transistor 5, the voltage between the terminals of each rotor winding 28 is controlled by switching respective transistor 22 so that a current at a desired value flows through each rotor winding 28.

FIG. 12 is a cross-sectional view showing the rotor 3. In the rotor 3, a certain number of discs are laminated together and mounted on the shaft 19. Each disc has slits 18 on the surface thereof and a certain thickness. The magnetic reluctance of the rotor 3 depends on the rotational position because of the present of the slits 18. FIG. 12 illustrates a 4-phase rotor. Returning to FIG. 9, the motor 2 mainly consists of a rotor 3, a stator 4, and rotational position sensing system 9. The rotational position sensing system 9 is position detection system that can measure the incremental position of the rotor 3. The rotor 4 connects to the power transistor 5 with three-phase power lines through which the motor 2 is energized by the power transistor 5. The motor control system 20 couples the power transistor 5 and the rotational position sensing system 9 with communication lines. In response to the incremental positional data POS2 of the rotor 3 from the rotational position sensing system 9, the motor control system 20 controls the position and velocity by system of a well-known technique, thus calculating a desired current value to energize the motor 2. After calculation of the current value, the motor control system 20 commands the power transistor 5 to supply the current command value Iref The power transistor 5 is controlled by the command value to flow the current Iref through the stator winding 28 in the stator 4 of the motor 2. Thus, the motor 2 generates a rotational force with the current Ip and thus rotates the rotor 3.

Referring to FIG. 10, the motor 2 consists of a rotor 3, a stator 4, rotational position sensing system 9, and origin position detecting system 12. The origin position detecting system 12 is position detecting system that can measure the origin position in one revolution of the rotor 3. The origin position detecting system 12 is coupled to the motor control system 20 by way of communication lines, like the rotational position sensing system 9. The motor control system 20 simultaneously receives data POS2 on incremental position the rotor 3 from the rotational position sensing system 9 as well as data POS 3 on origin poisition of the rotor 3 from the origin position detecting system 13. The motor control system 20 calculates data on position of the rotor 3 based on data POS2 and POS3 and performs the above-mentioned control so as to supply the current Ip to the motor based on the resultant data.

As described earlier with FIGS. 9 and 10, the position of the rotor can be detected by using either the incremental positional data POS2 of the rotor 3 or positional data by obtained combining the incremental positional data POS2 with the origin positional data POS3 of the rotor 3. This allows the motor to be precisely controlled. However, according to the conventional positional detection, the position of the rotor 3 cannot be detected just before the motor 2 is driven by turning on power. The position of the rotor 3 just before the motor is driven is hereinafter referred to as an initial position of the rotor 3. Since the rotational position sensing system 9 senses the incremental position of the rotor 3 when the teeth of a gear, for example, attached on the rotor 3 cross the detection plane thereof, the positional detection cannot be performed when the rotor 3 does not rotate. Moreover, the origin position detecting system 13 detects only one channel grooved in the disc attached on the rotor 3 according to the above-motioned detection method. Hence, the positinal detection cannot be performed if the rotor 3 rotates at least one turn. As described above, the initial position of the rotor 3 cannot be detected by means of only the rotational position sensing system 9 or both the rotational position sensing means 9 and the origin position detecting system 13.

A conventionally-improved positional position sensing device that detects the initial position of the rotor 3 will be described below with reference to FIGS. 11 and 13. FIG. 13 shows the relation between terminal voltage V (y-axis) and time (x-axis) and the relation between detection current Im (y-axis) and time (x-axis). In FIG. 11, the current metering system 6 consists of a current detector 24, an insulating resistor 25, an A/D converter 26, and rotational position arithmetic system 27. In FIG. 13, V represents a terminal voltage across the stator winding 28. That is, the stator winding 28 is formed of three phase coils. The terminal voltage between arbitrary two phase coils is V. The detection current Im is a current flowing through one of the two phase coils between which the voltage V is applied. Hence, the relation between V and Im is represented as illustrated in FIG. 11. As described earlier, since the power transistor 5 can control the voltage between the terminals of the stator winding 28 by switching the transistors 22, the terminal voltage V having the waveform shown in FIG. 13 can be applied across the stator winding 28. In this case, the detection current Im flowing through the stator winding 28 increases with a constant slope according to the inductance of the stator winding 28 and then begins to decrease when the terminal voltage V becomes 0. On the other hand, in the current metering system 6, the A/D converter 26 converts a current value draining through the insulating resistor 25 from the current detector 24 into digital data. The rotational position arithmetic system 27 receives data on current value and then calculates the gradient k of the detection current Im to time. Since k is a differential coefficient of detection current Im to time, $k = dIm/dt$ (Eq. 1). The relation between gradient k of detection current Im and terminal voltage V is repressed by the equation $V/2 = L \times k + R \times Im$ (Eq. 2), where L is inductance and R is a resistance value per phase of the stator winding 28. Hence, the inductance can be obtained by the above-mentioned equation. The inductance of the stator winding 28 contains the mutual inductance between the rotor 3 and the stator winding 28, in addition to the self inductance. Since the mutual inductance varies by the polar position of the rotor 3, the inductance to be measured varies with the position of the rotor 3. Hence, the position of the rotor 3 can be decided by sequentially performing a certain calculation based on the inductance value. The terminal voltage V can be controlled as shown in FIG. 14 by switching the power transistor 5 shown in FIG. 11. In this case, there is the advantage of quickly converging the detection current Im. As described above, the position of the rotor 3 can be decided by means of the current metering system 6.

As described above, the position of the rotor 3 can be decided according to the prior art. However, the position of the rotor 3 to be decided corresponds to a change in inductance per period. FIG. 15 is a waveform showing changes in inductance within an electrical angle of 360° of a conventional N-phase motor. As understood from the figure, There are changes in inductance for two periods within the electrical angle of 360°. Hence, when the position of the rotor 3 is decided according to the inductance position detecting method, only the position for an electrical angle of 180° can be measured. If the rotor 3 is formed of a permanent magnet, the rotational direction of the rotor 3 cannot be controlled because the polarity of the rotor 3 changes every electrical angle of 180°. If a measured position of the rotor 3 differs from an actual position by an electrical angle of 180°, the rotor 3 reversely rotates to the direction by the command. As described above, the prior art can detect the initial position of a rotor and measures only the position of the rotor for an electrical angle of 180°. Hence, there is the disadvantage in that where an opposite polarity comes on the rotor of a permanent magnet every electrical angle of 180°, the rotor may be reversely rotated.

According to the prior art, the position of the rotor 3 can be measured in the above-mentioned method. However, since the position of the rotor 3 is calculated by metering the detection current Im in active state, this method causes large detection errors. It is may be considered that such a method is unsuitable for precision control. The reason is that the measured value contains large noises upon current detection. As the number of revolutions increases, the errors upon inductance detection increase. Since the precision of inductance to be calculated worsens necessarily, precise control cannot be performed. There is the disadvantage in that the prior art described above is unsuitable for precise control because the initial position of the rotor cannot be detected or the detection error of initial position is large.

SUMMARY OF THE INVENTION

The objective of the present invention is to solve the above-mentioned problems.

Moreover, the objective of the invention is to provide a motor control device that can perform precise control and can control the rotational direction even when a rotor has a polarity upon initial position detection.

According to the present invention, the motor control device comprises first metering voltage signal generating system that sequentially creates 2N-phase signals to an N-phase motor. The motor control device further comprises either rotational position sensing system that can measure incremental position of the rotor or origin position detecting system that can detect the origin position of the rotor, in addition to a position sensing technique that measures changes in inductance to decide the position of a rotor. The motor control device may further comprise a power transistor for position detection, a power transistor for motor drive, and switching system that selects the position detection power transistor or the motor drive power transistor.

According to the present invention, since an N-phase motor that the magnetic reluctance of the rotor viewed from the stator depends on the rotational position is used, the rotational direction can be controlled even when the initial position detection is carried out at an electrical angle of 180°. Moreover, since the combination of conventional initial position sensing technique and a well-known position detector can realize initial position detection as well as precise control.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Next, preferred embodiments of the present invention will be described below with reference to the attached drawings.

Figure 9:
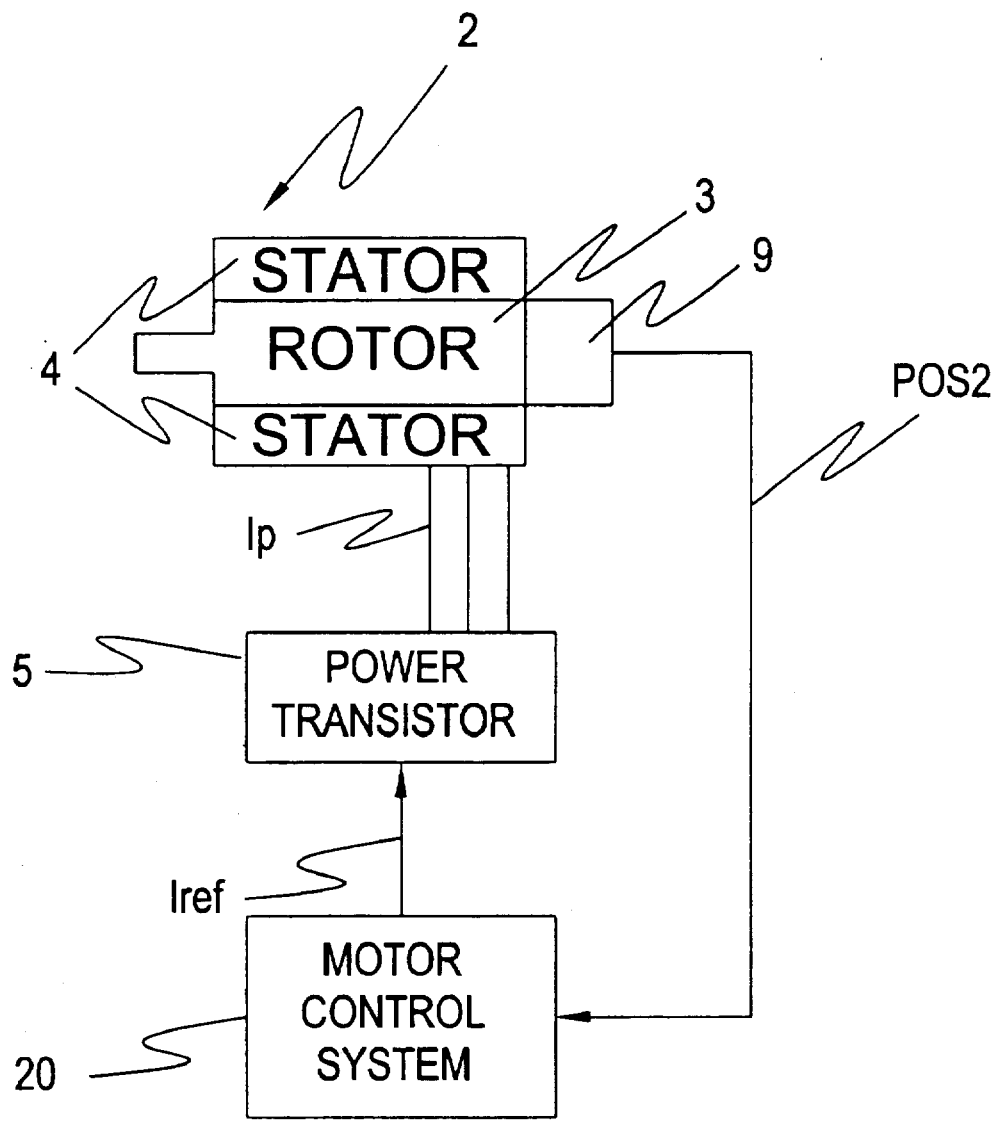
FIG. 9 is a block diagram showing an example of a conventional control detector.
Figure 10:
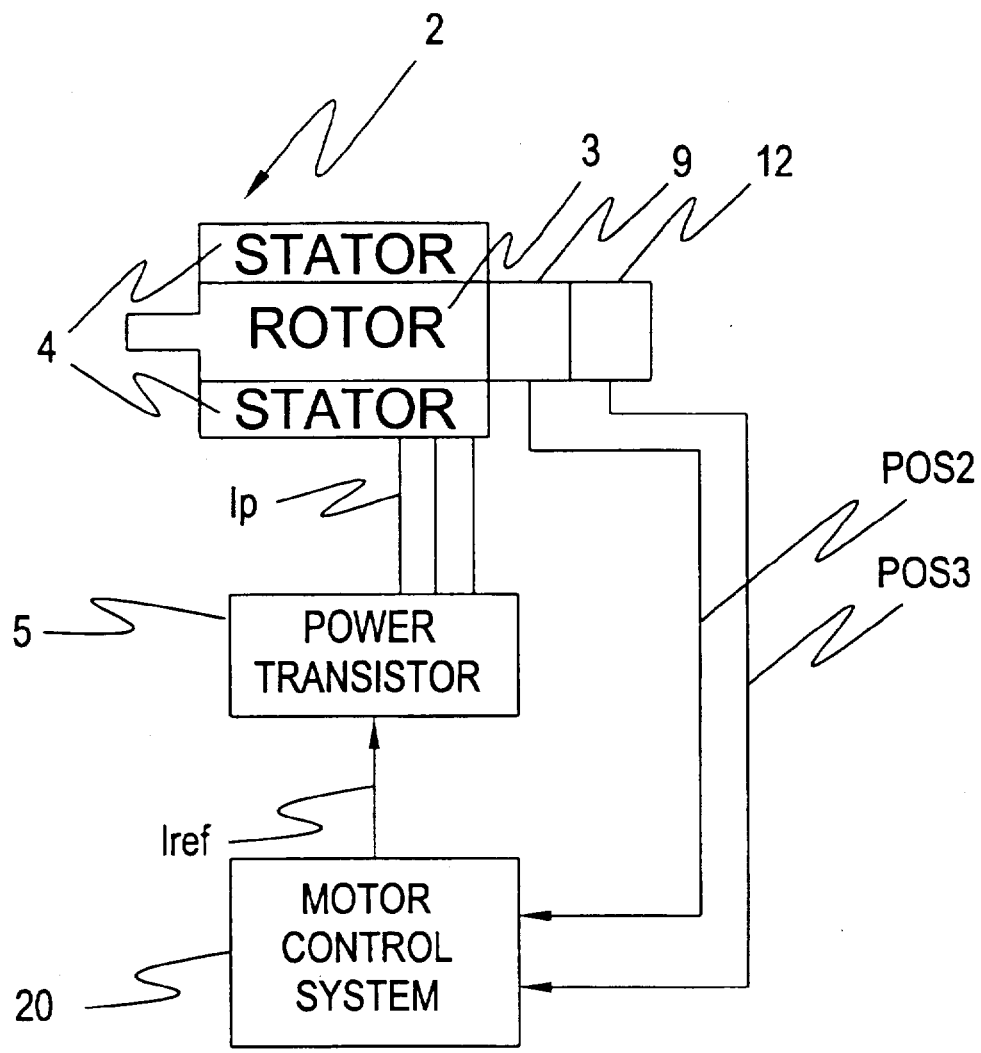
FIG. 10 is a block diagram showing another example of a conventional control detector.
Figure 11:
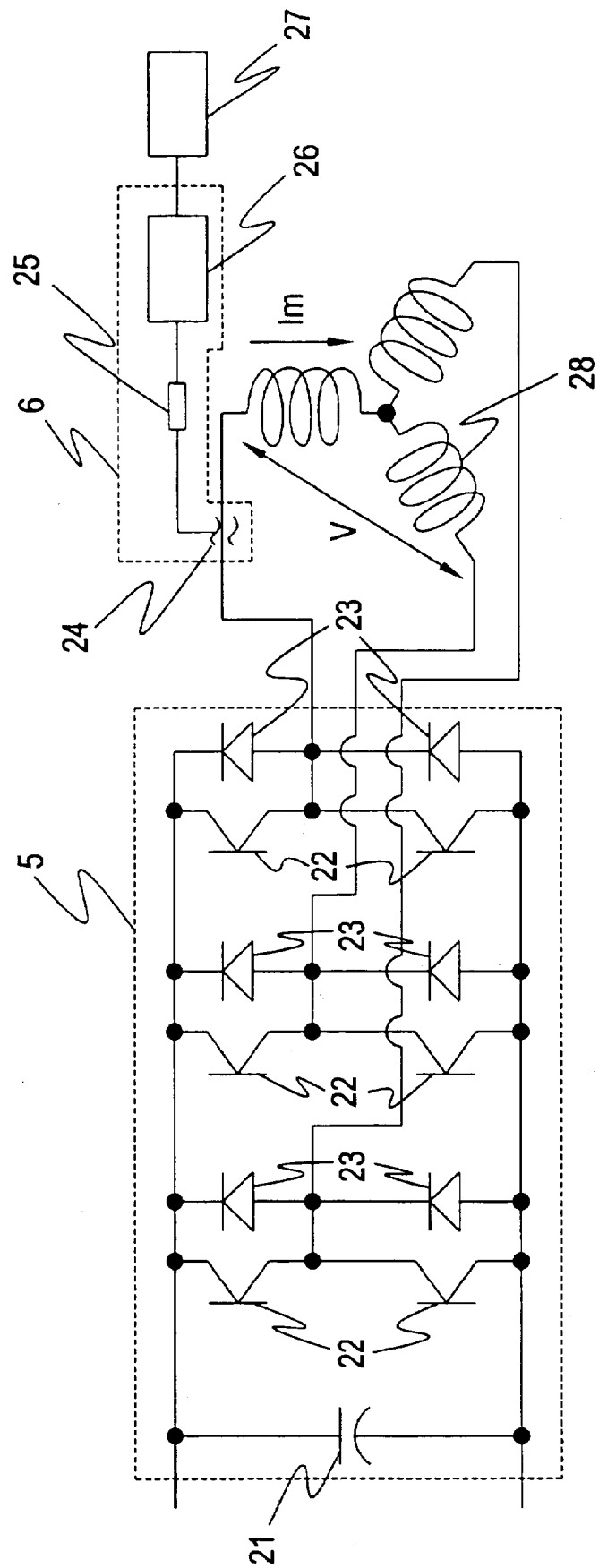
FIG. 11 is a circuit diagram showing a conventional configuration including the power transistor 5 and the current metering means 6.
Figure 12:
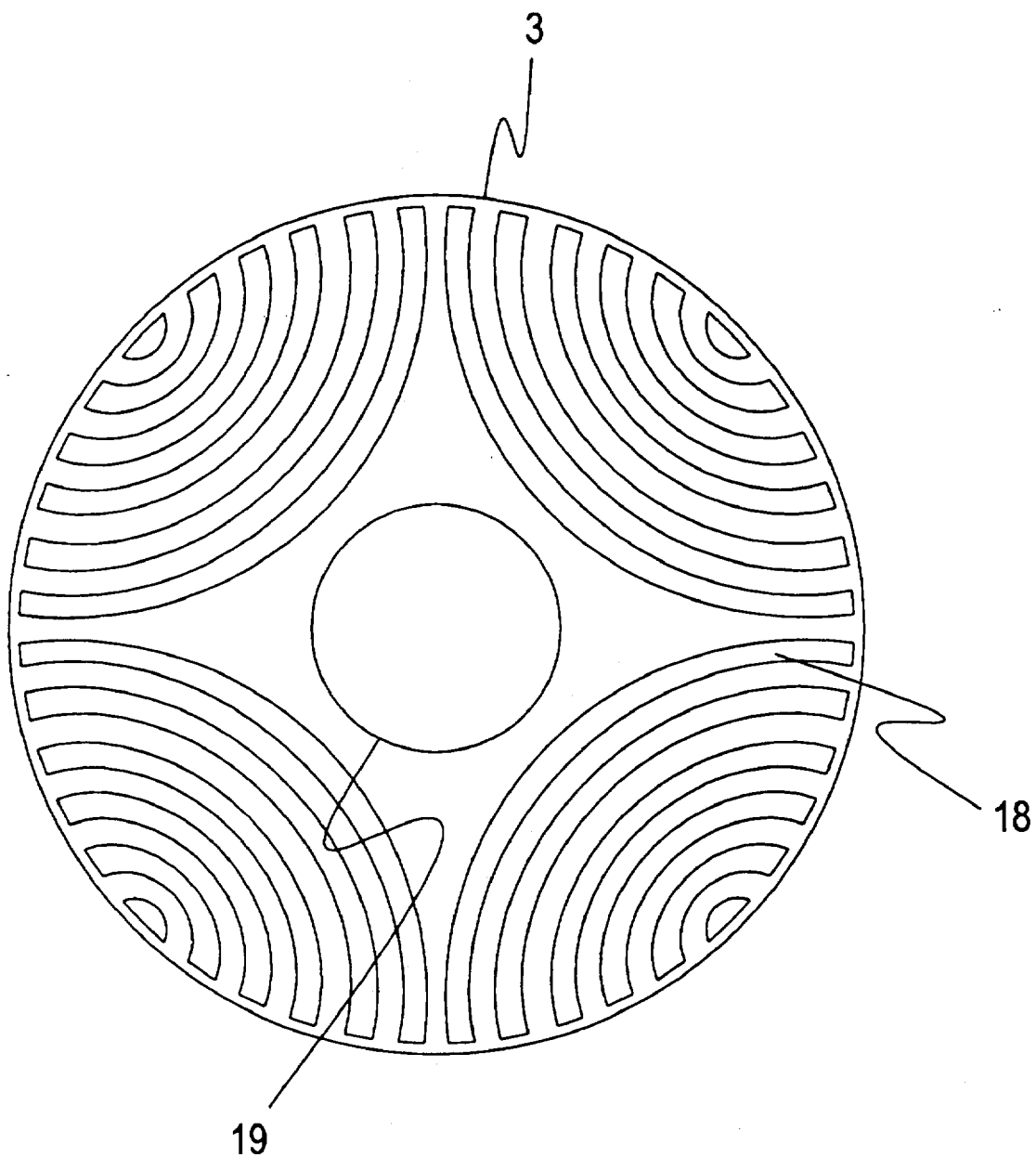
FIG. 12 is a cross-sectional view showing the rotor 3 of a motor.
Figure 13:
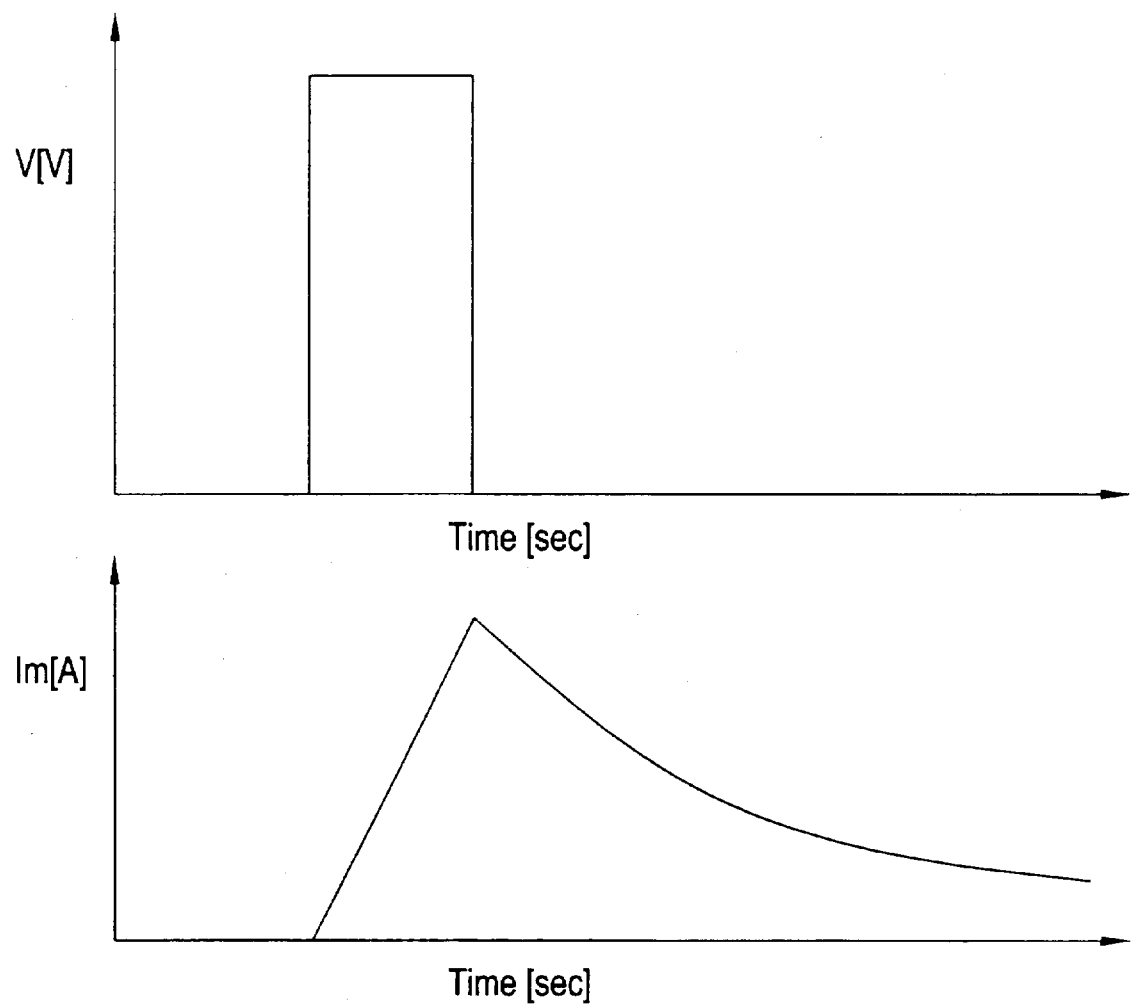
FIG. 13 is a waveform diagram showing a relation between terminal voltage V and time and a relation between detected current Im and time, upon initial position detection in a prior art.
Figure 14:
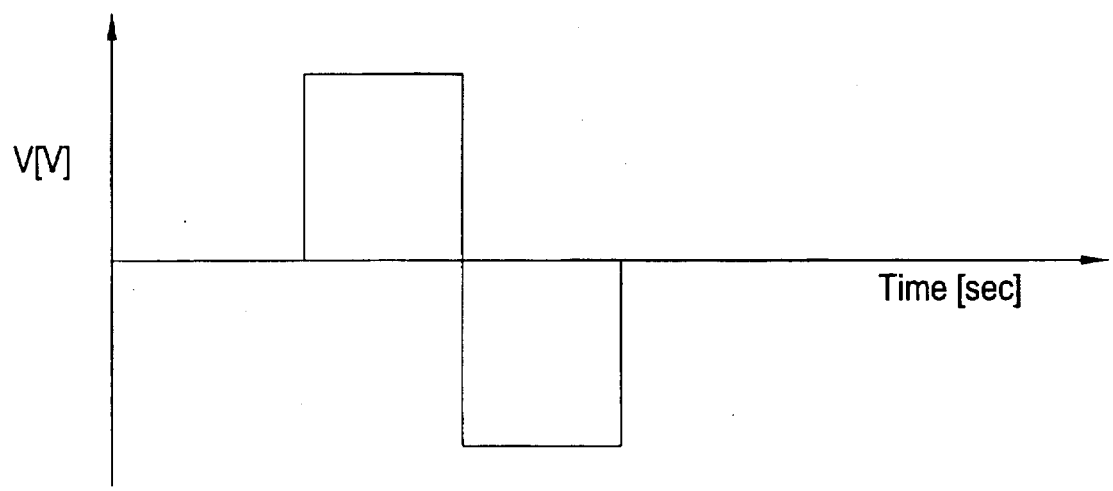
FIG. 14 is a waveform diagram showing a relation between terminal voltage V and time and a relation between detected current Im and time, upon initial position detection in a prior art.
Figure 14:
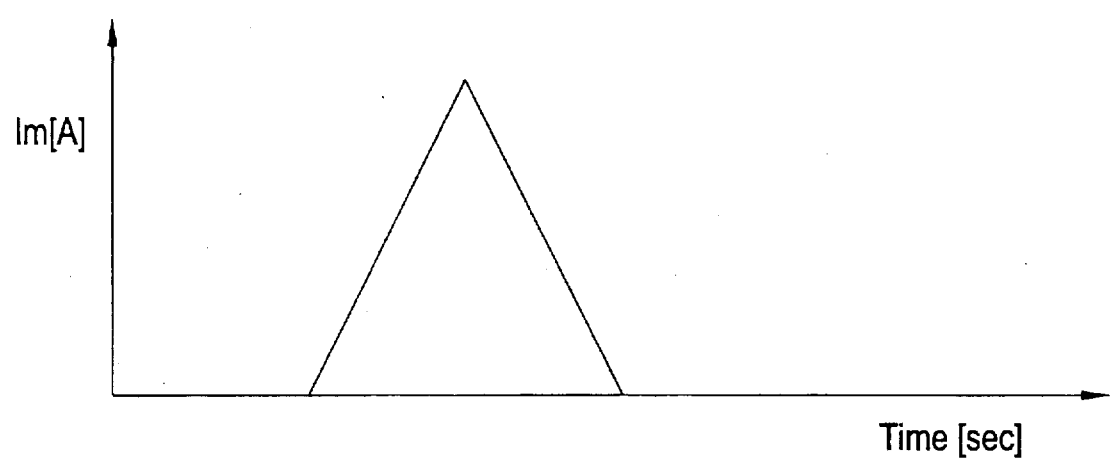
Figure 15:
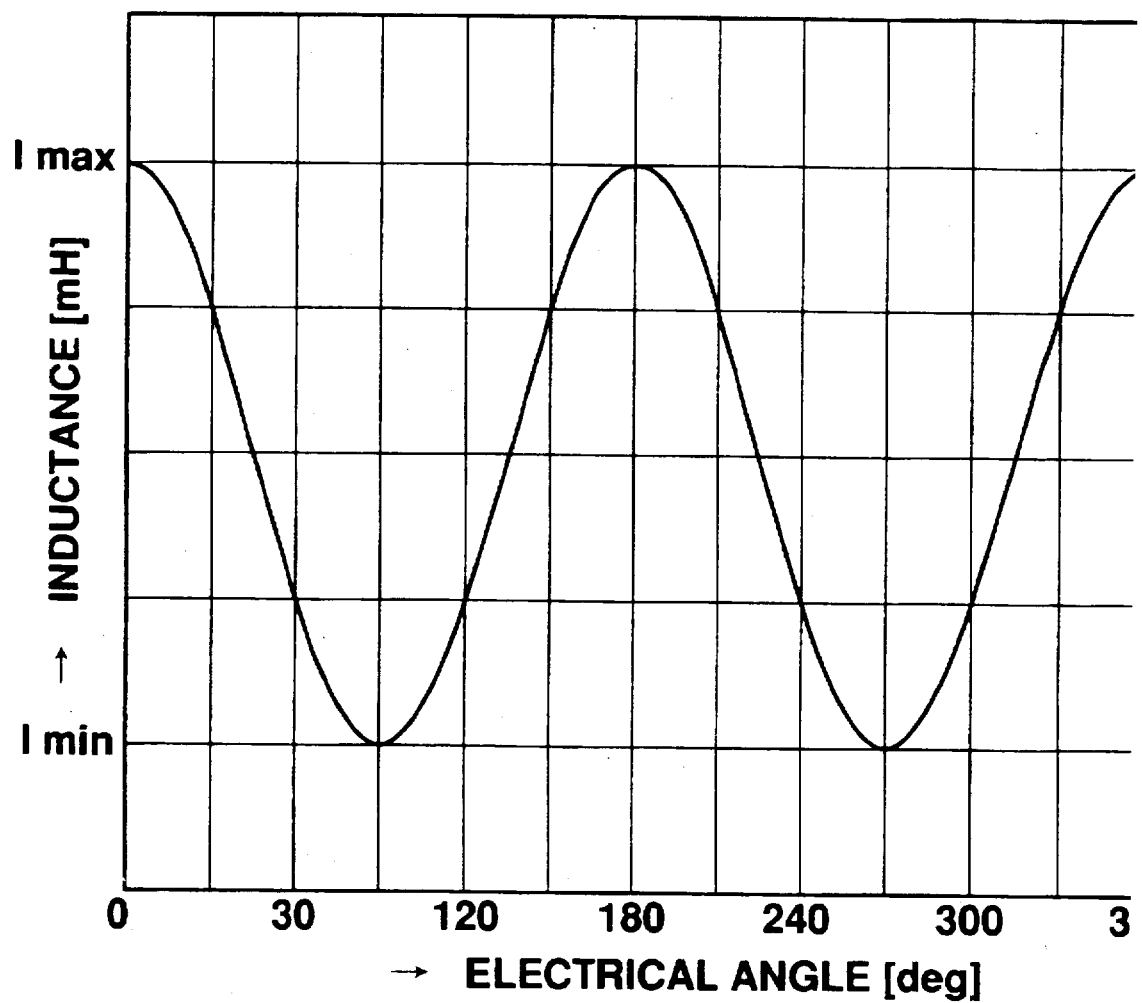
FIG. 15 is a diagram showing variations in inductance within the electrical angle 360° of a conventional N-phase motor.

FIGS. 1, 2, 3, and 4 show motor control devices according to respective embodiments of the present invention. Numerals identical to those in FIGS. 9 and 10 illustrating the prior art represent the same elements and functions and effects. Hence, the duplicate explanation will be omitted here.

Figure 1:
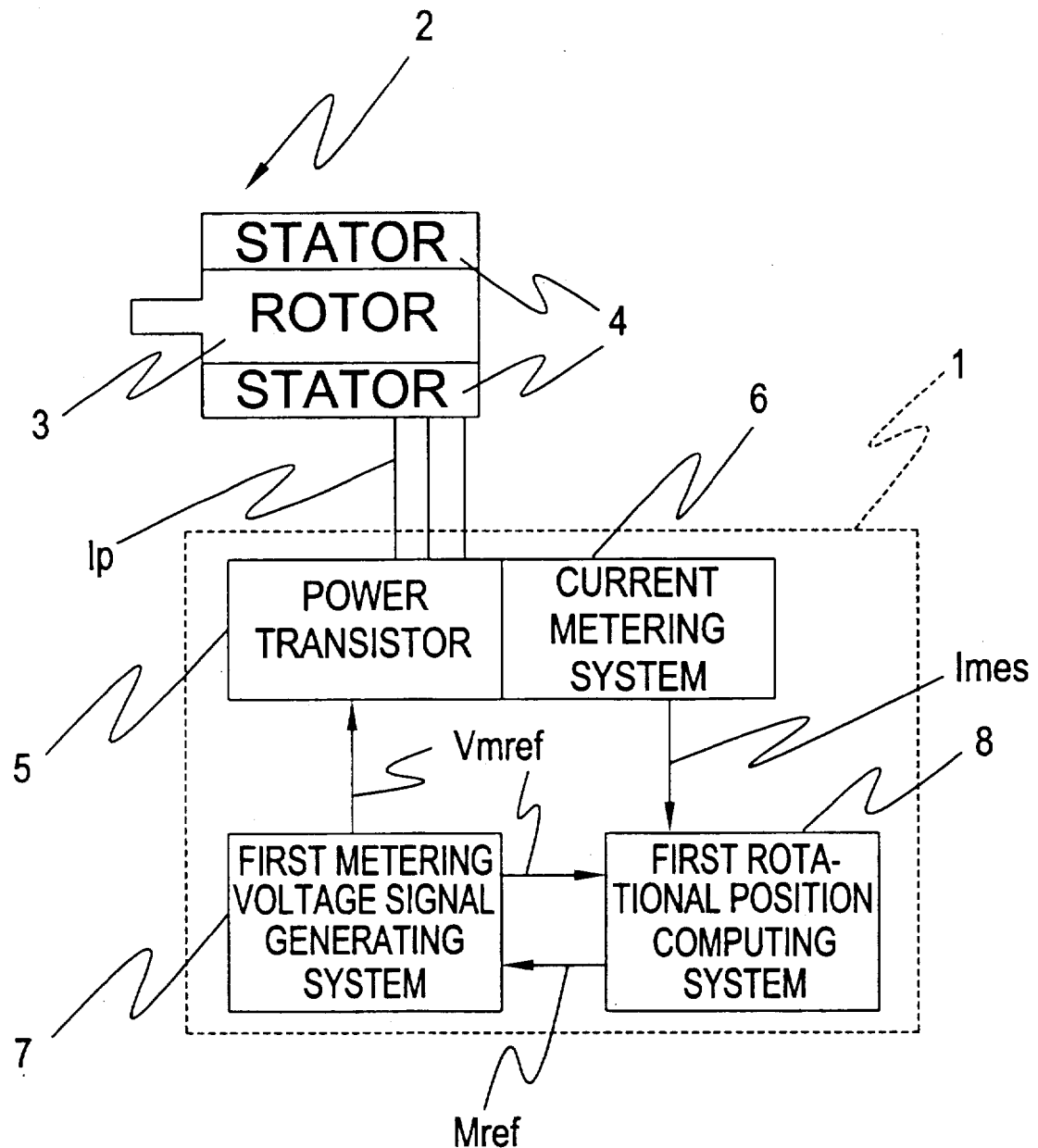
FIG. 1 is a block diagram showing a motor control device according to a first embodiment of the present invention.

FIG. 1 shows the first embodiment of the present invention. Referring to FIG. 1, the motor control device 1 consists of a power transistor 5, current metering system 6, first metering voltage signal generating system 7, and first rotational position arithmetic system 8. The first rotational position arithmetic system 8 is coupled to the current metering system 6 and the first metering voltage generating system 7 via communication lines. The first metering voltage signal generating system 7 is coupled to the first rotational position arithmetic system 8 and the power transistor 5 via communication lines. Next, a sequence of process in the motor control device 1 will be described below. The first rotational position arithmetic system 8 transmits an initial position detection command Mref to the first metering signal generating system 7. The first metering voltage signal generating system 7 includes a storage device that previously stores data representing that the motor to be controlled is of N phases. When receiving the initial position detection command Mref, the first metering signal generating system 7 sequentially creates 2N-phase voltage signals and then output them to the power transistor 5. The power transistor 5 controls each phase voltage of the motor based on the voltage signal Vmref. The current metering system 6 measures the detection current value and then outputs it to the first rotational position arithmetic system 8. The first rotational position arithmetic system 8 calculates inductance by solving the equations (Eq. 1) and (Eq. 2) based on the measured detection current value and the voltage signal Vmref transmitted from the first metering voltage signal generating system 7. Then, the position of the rotor 3 is decided by performing the calculation process in a manner similar to the conventional manner. The sequential process of the motor control device shown in FIG. 1 has been described. According to the embodiment of the FIG. 1, the first metering signal generating system 7 previously holds data regarding the number of phases of the motor 2 and produces N-phase voltage or 2N-phase voltage signals based on it. For that reason, since the motor 2 has the structure in which the magnetic reluctance of the rotor 3 viewed from the stator 4 depends on its rotational position, the position of the rotor 3 can be obtained and the rotational direction can be controlled.

Figure 2:
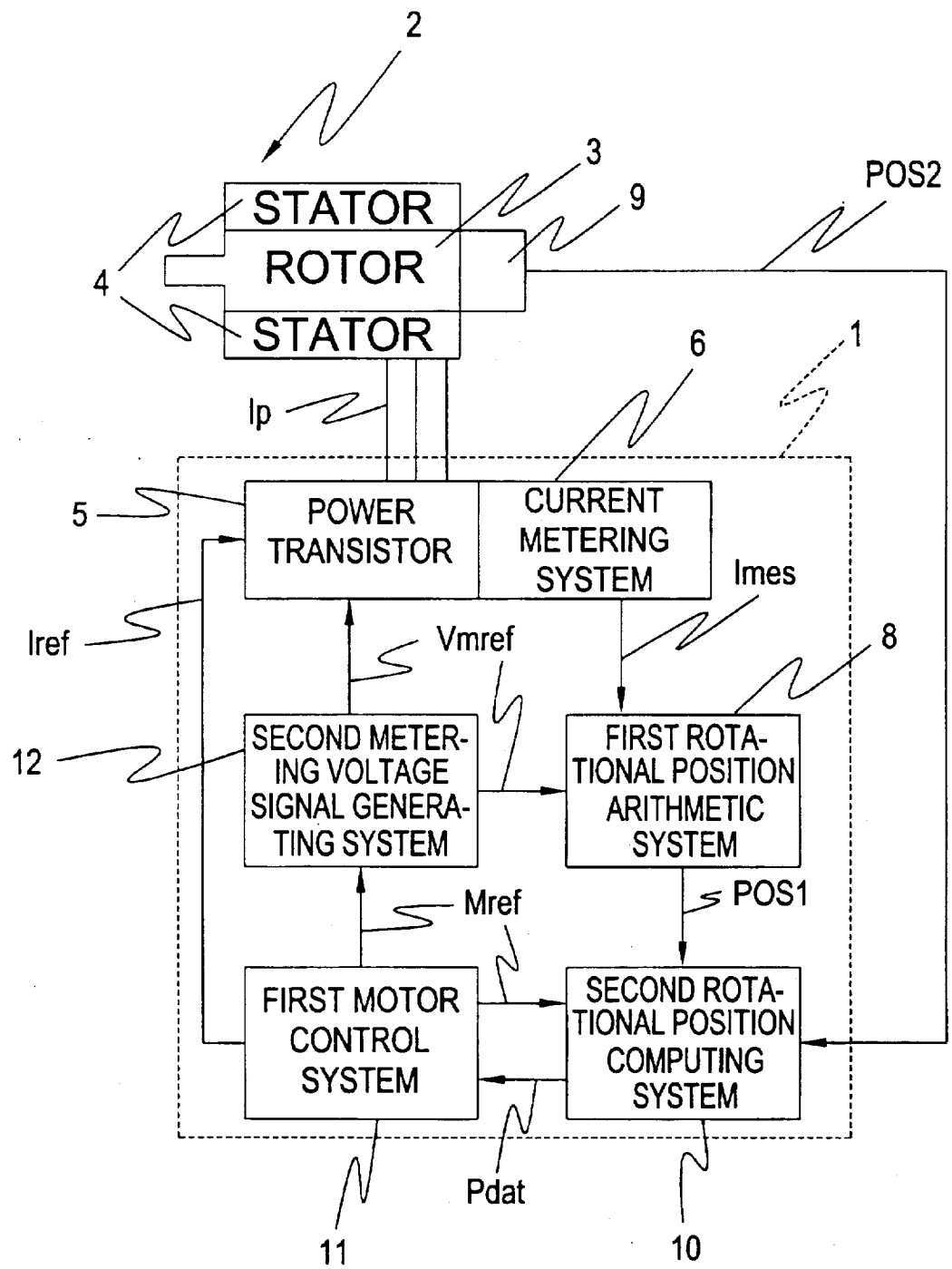
FIG. 2 is a block diagram showing a motor control device according to a second embodiment of the present invention.
Figure 5:
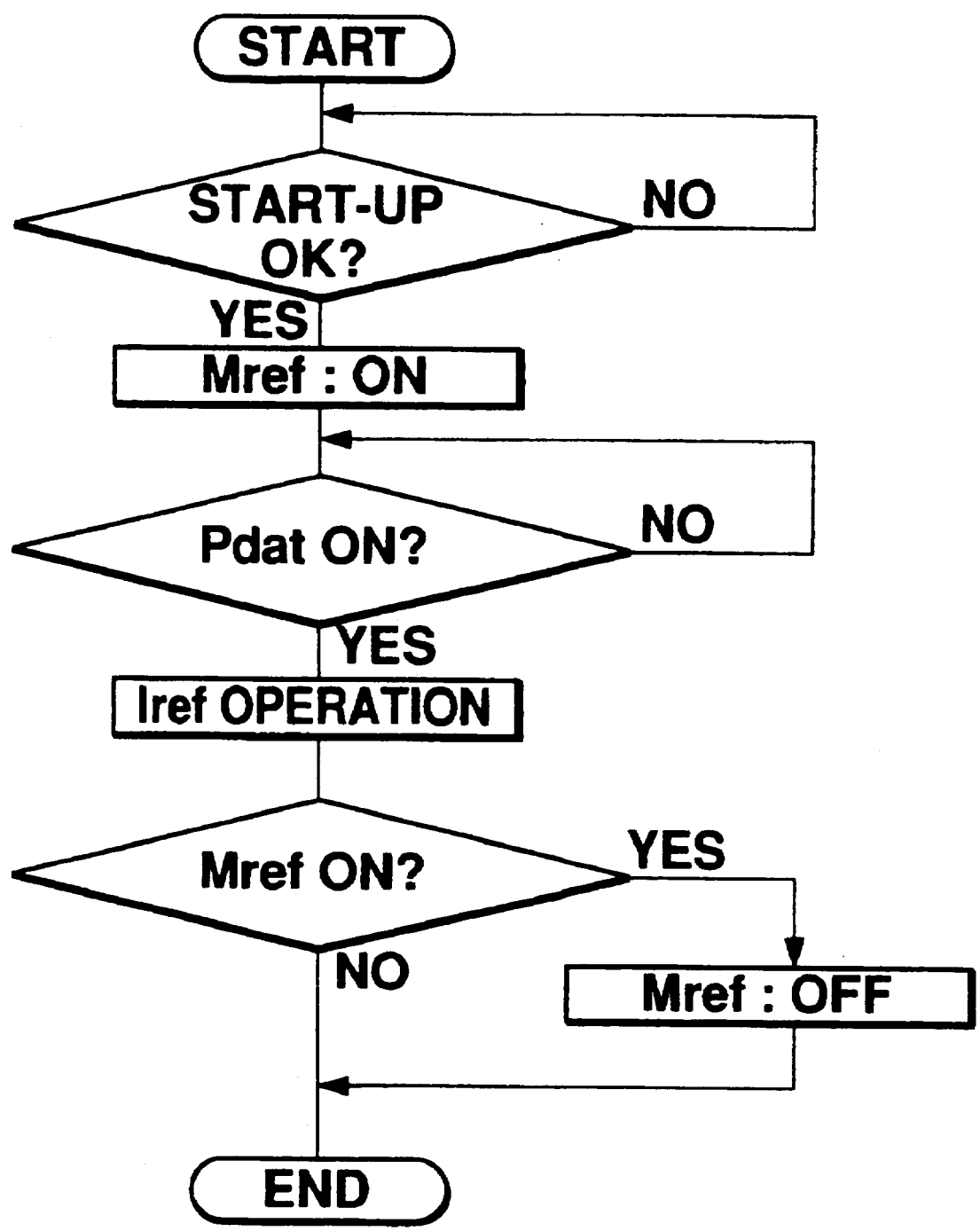
FIG. 5 is a flowchart showing the process of the first motor control means 11 upon initial position detection according to the present invention.
Figure 6:
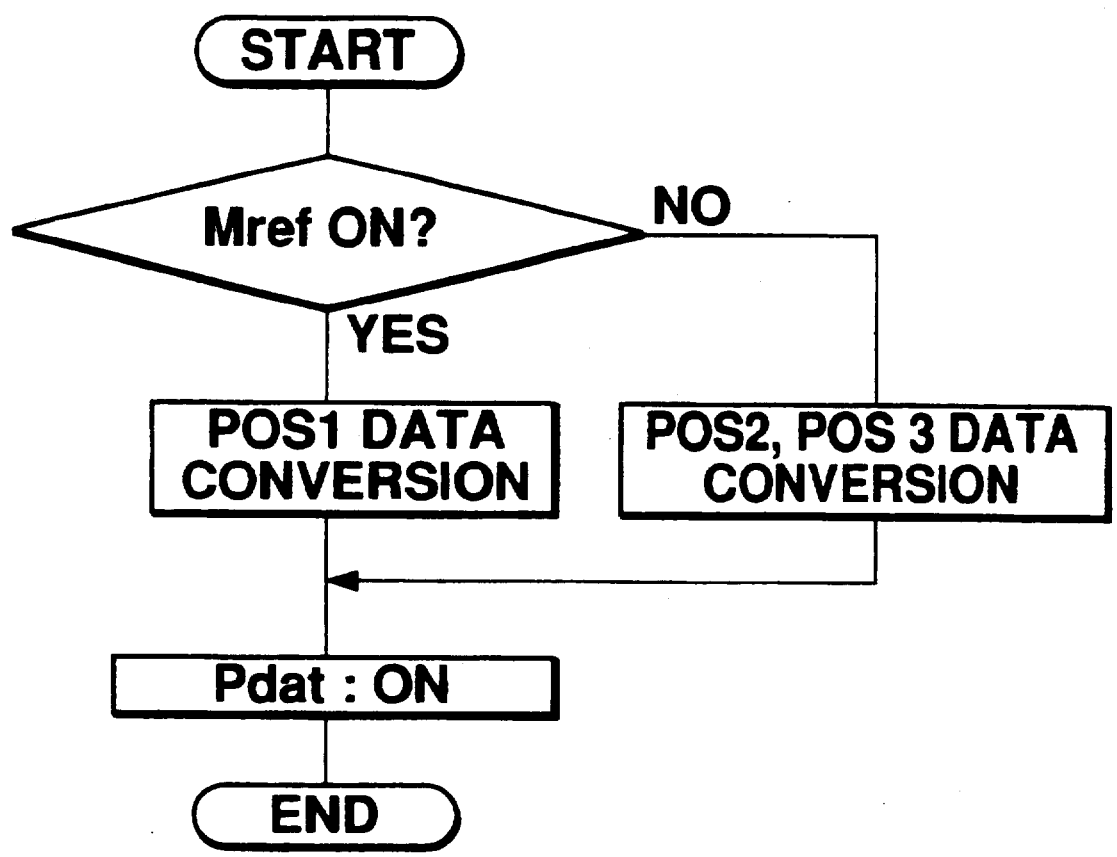
FIG. 6 is a flowchart showing the process of the second rotational position arithmetic means 10 upon initial position detection according to the present invention.

FIG. 2 shows the second embodiment of the present invention. The motor control device 1 includes a second metering voltage generating system 12, first motor control system 11 and the first rotational position arithmetic system 10, in addition to the power transistor 5, the current metering system 6, the first rotational position arithmetic system 8. As shown in FIG. 2, the first motor control device 11 connects to the power transistor 5, the second metering voltage signal generating system 12 and the second rotational position arithmetic means 10 via communication lines. The second metering voltage signal generating system 12 connects to the first motor control system 11, the power transistor 5, and the first rotational position arithmetic system 8 via communication lines. The second rotational position arithmetic system 10 connects to the first motor control system 11, the first rotational position arithmetic system 8, and the rotational position detecting system 9 via communication lines. Other elements are mutually connected in the manner similar to those shown in FIG. 1. Hence, the detail explanation will be omitted here. Next, a series of process within the motor control device 1 will be described below with reference to FIGS. 5 and 6. FIG. 5 is a flowchart showing the process of the first motor control system 11. FIG. 6 is a flowchart showing the process of the rotational position arithmetic system 10. The first motor control system 11 confirms the fact that the motor 2 has started up in its previous state when being powered on at operation initiation and then transmits the initial position detection command Mref to the second metering voltage signal generating system 12. In response to the initial position detection command Mref, the second metering voltage signal generating system 12 transmits the voltage signal Vmref to the power transistor 5 and the first rotational position arithmetic operation system 8. The second metering voltage signal generating system 12 may generates as the voltage signal Vmref a reference voltage signal of at least two constant period, different from the from the first metering voltage signal generating system 7 shown in FIG. 1. When the second metering voltage signal generating system 12 outputs the reference voltage signal Vref, the power transistor 5, the current metering system 6 and the first rotational position arithmetic system 8 operate in the manner similar to that in FIG. 1. The first rotational position arithmetic system 8 transmits the initial position POS1 of the rotor 3 to the second rotational position arithmetic system 10. The second rotational position arithmetic system 10 normally converts the incremental position data POS2 transmitted from the rotational position detecting system 9 into the rotational position data Pdat and then transmits the resultant to the first motor control system 11. However, only when the first motor control system 11 transmits the initial position detection command Mref, the second rotational position arithmetic system 10 converts the incremental position data POS1 transmitted from the first rotational position arithmetic system 8 into the rotational position data Pdat and then transmits the resultant to the first motor control system 11. As soon as the first motor control system 11 receives the rotational position data Pdat in an ON (issue) state of the initial position command Mref, a drive current command Iref is created according to a well-known method and then is transmitted to the power transistor 5. At the same time, when the initial position detection command Mref is stopped (OFF), the motor 2 begins to run. Since the initial position detection command Mref is not issued after the drive operation, the second metering voltage signal generating system 12 does not work. The second rotational position arithmetic system 10 does not use POS1 for arithmetic operation. This means that the motor 2 is controlled according to the conventional technique. According to the sequential process, the motor 2 is controlled based on the initial position and the incremental rotational position at the time of drive operation. This feature enables more precise drive operation.

Figure 3:
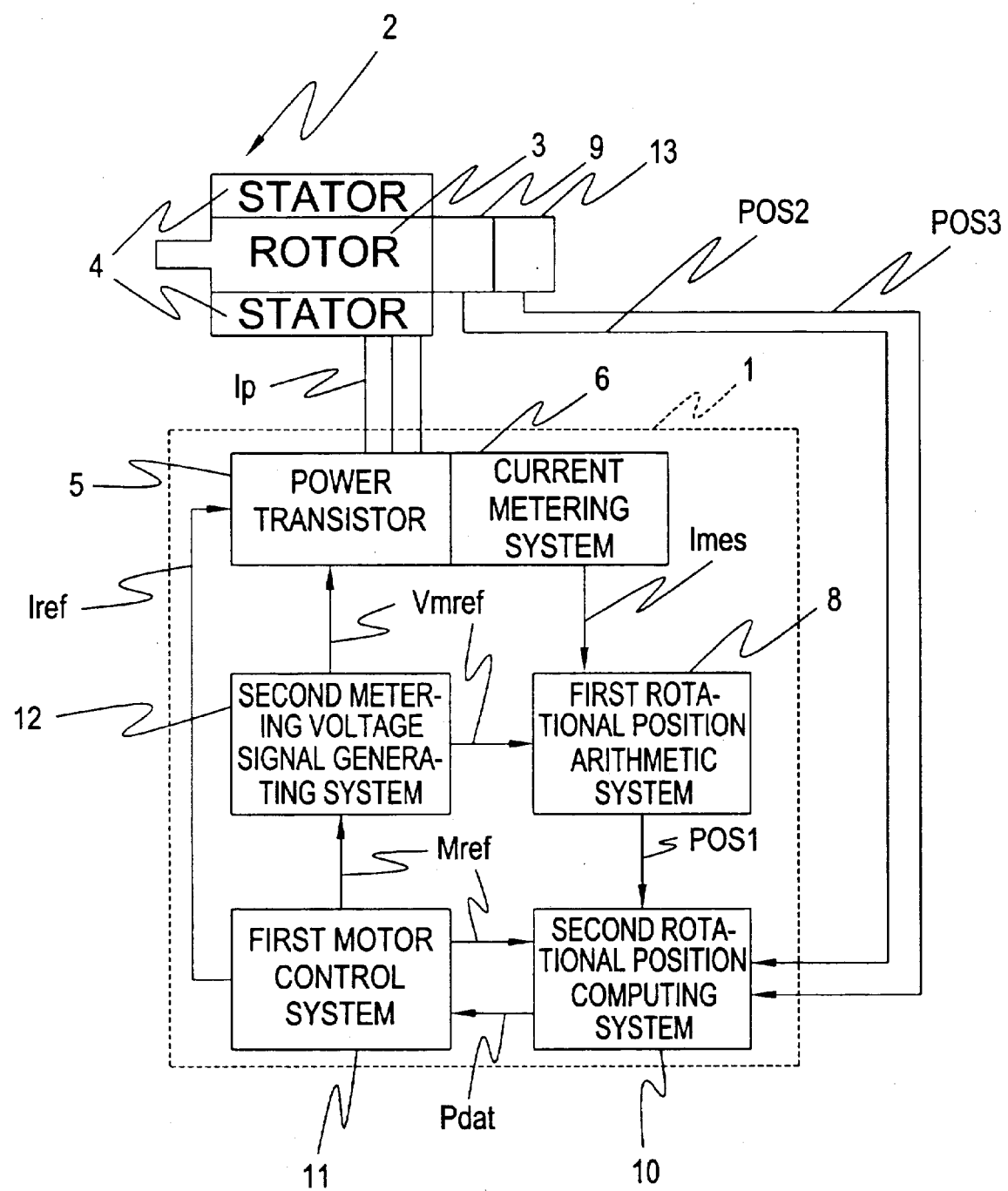
FIG. 3 is a block diagram showing a motor control device according to a third embodiment of the present invention.

FIG. 3 shows the third embodiment of the present invention. The configuration of the motor control device 1 is basically the same as that in FIG. 2. An origin position detecting system 13 is additionally attached to the motor 2. This embodiment is different from the first embodiment shown in FIG. 2 in that the second rotational position arithmetic system 10 is connected to the origin position detecting system 13. Hence, detail explanation will be omitted here. A sequential process within the motor control device 1 will be described below. The second rotational position arithmetic system 10 normally combines the rotational position data Pdat transmitted to the first motor control system 11 with the incremental position data POS2 transmitted from the rotational position sensing system 9 and the origin position data POS3 transmitted from the origin position detecting system 13, and then subjects the resultant to the conversion process shown in FIG. 2, and finally transmits the rotational position data Pdat to the first motor control system 11. The process in other elements is similar to that in FIG. 2. The process of the second rotational position arithmetic system 10 when the command Mref has been transmitted is similar to that in FIG. 2. Hence, the duplicate description will be omitted here. According to the sequential process, the motor 2 is controlled based on the initial position, the incremental rotational position at the time of drive operation, and the origin position of the rotor 3. This feature enables more precise drive operation.

Figure 4:
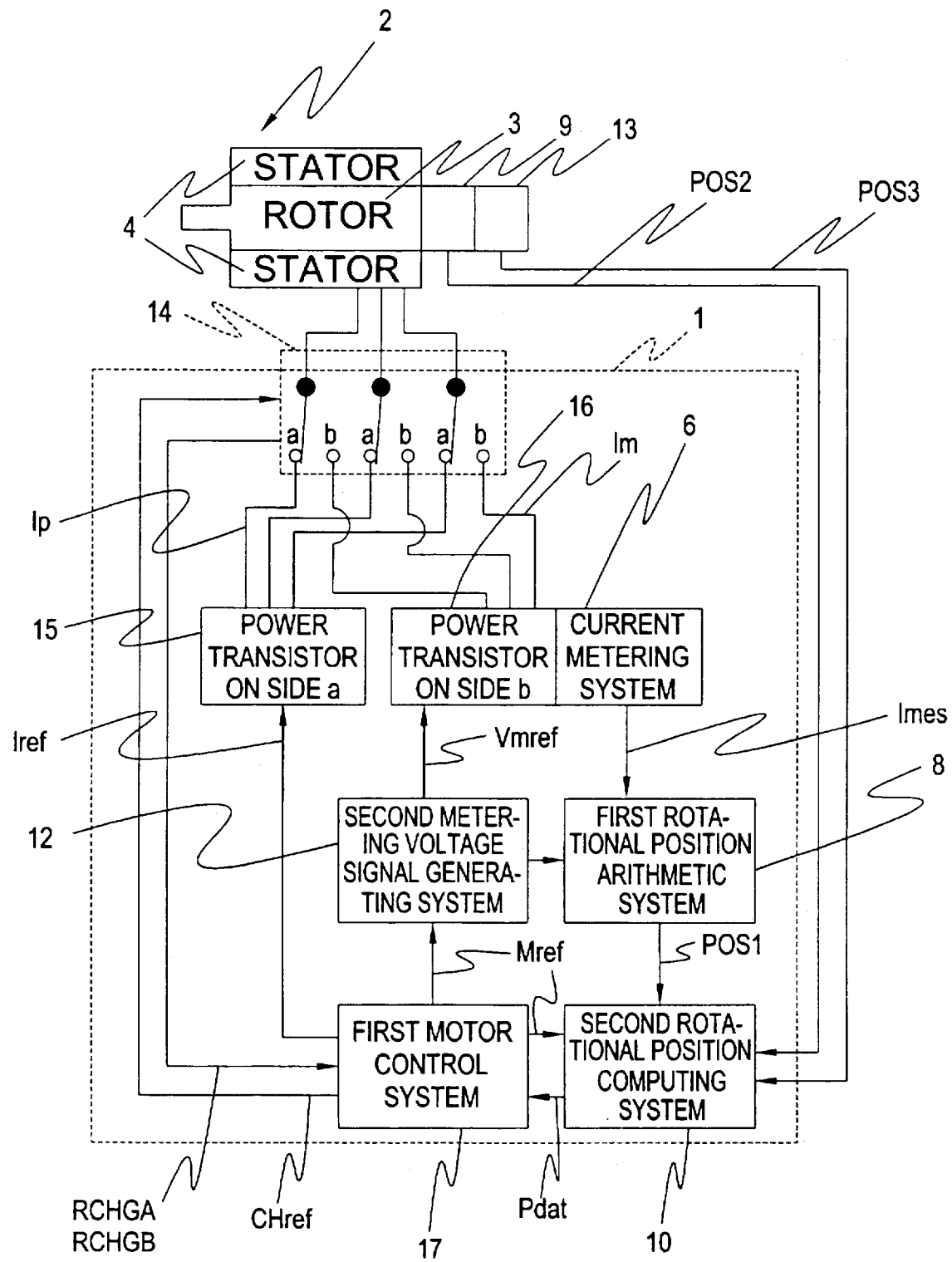
FIG. 4 is a block diagram showing a motor control device according to a fourth embodiment of the present invention.
Figure 7:
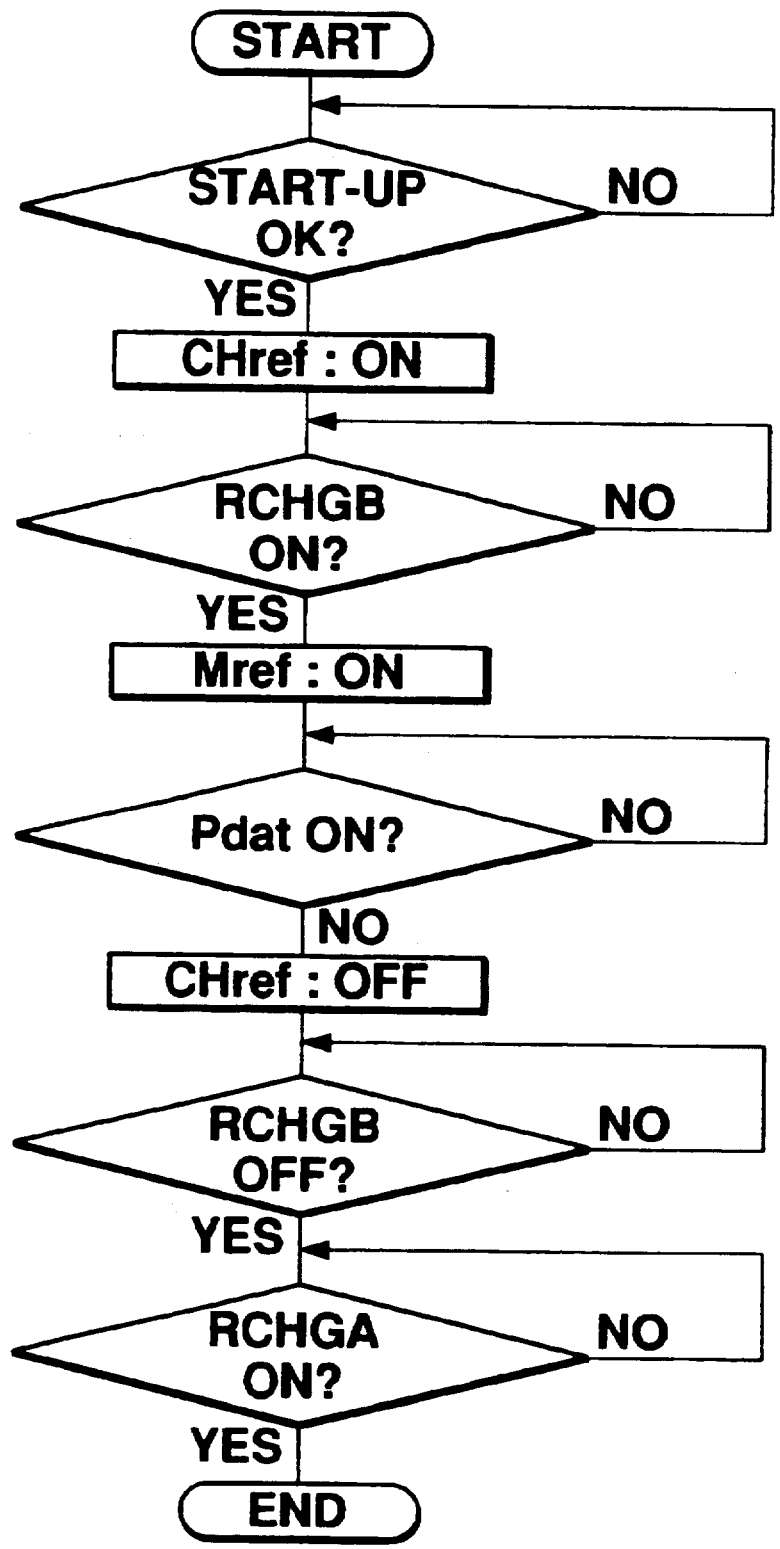
FIG. 7 is a flowchart showing the process of the second motor control means 17 upon initial position detection according to the present invention.
Figure 8:
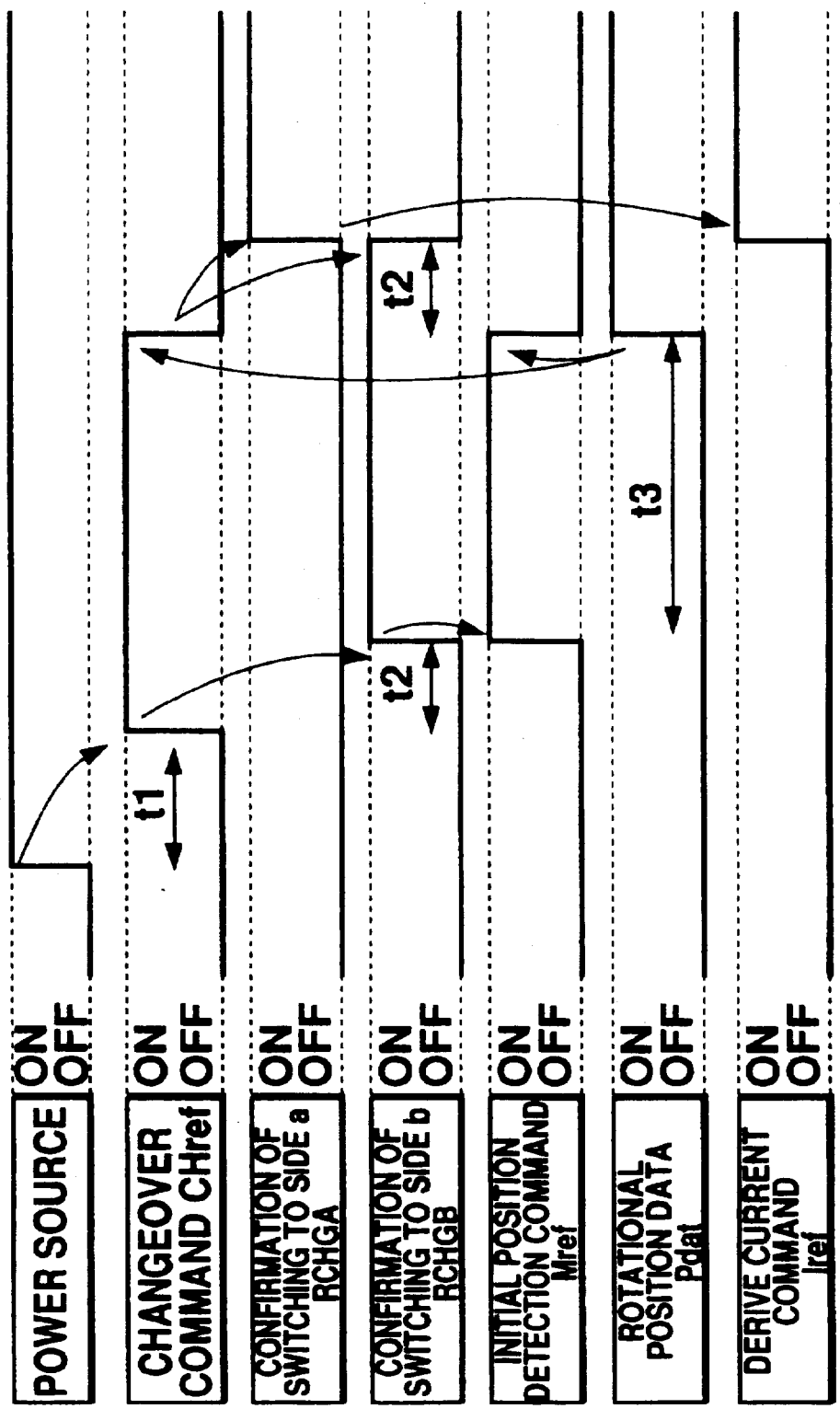
FIG. 8 is a flowchart showing the process of detecting the initial position by the switching means 14 according to the present invention.

FIG. 4 shows the fourth embodiment of the present invention. In the configuration of the motor control device 1, switching system 14 is added. The first motor control system 11 is used instead of the second motor control system 17. Power transistors 15 on the side a and power transistors 16 on the side b are used instead of the power transistor 5. Other arrangement is the same as that in FIG. 2. The switching system 14 selectively connects the rotor winding 28 in the stator 4 to the power transistors 15 on the side a or the power transistors 16 on the side b. The three phase current components always flow in synchronous state. The switching system 14 is realized by using, for example, one or plural three-phase electromagnetic connectors. The configuration, function and effect of the power transistors 15 on the side a is the same as those of the power transistor 5. The configuration, function and effect of the power transistors 16 on the side b is the same as those of the power transistor 5. In the switching system 14, the stationary contacts are respectively connected to the three phase coils of the stator winding 28 in the stator 4. The changeover contacts are respectively connected to the three coils of the power transistors 5. The changeover contacts a are respectively connected to the power transistors 15 on the side a while the changeover contacts b are respectively connected to the power transistors 16 on the side b. The power transistors 15 on the side a are connected to the second motor control system 17. The power transistors 16 on the side b are connected to the second measuring voltage signal generating system 12. The second motor control system 17 is connected to the power transistors 15 on the side a, the second metering voltage signal generating system 12, and the second rotational position arithmetic system 10, and the switching system 14 via communication lines. The sequential process of the motor control device 1 will be described below with reference to FIGS. 7 and 8. FIG. 7 is a flowchart showing the process of the second motor control system 17 at the time of initial position detection. FIG. 8 is a time chart showing changes in time of signals in the motor control device 1 at the time of initial position detection. When the second motor control system 17 confirms the start-up of the motor control device 1 upon power-up, it first issues the switching command CHref to the switching system 14. In response to the switching command CHref, the switching system 14 selects the contacts b to send the side (b) changeover confirmation signal RCHGB to the second motor control system 17. In response to the changeover confirmation signal RCHGB, the second motor control system 17 immediately sends the initial position detection command Mref to the second metering voltage signal generating system 12. As to the second metering voltage signal generating system 12, the power transistors 16 on the side b, the current metering system 6, the first rotational position arithmetic system 8, and the second rotational position arithmetic system 10, the same process as that in FIG. 3 is carried out to detect the initial position. Thereafter, when the second motor control system 17 receives the rotational position data Pdat, it immediately stops sending the initial position detection command Mref and the changeover command CHref. In response to a signal representing the OFFed changeover command CHref, the switching system 14 selects the contacts a to send the side (a) changeover confirmation signal RCHGA to the second motor control system 17. After confirming that the changeover confirmation signal RCHGA is issued, the second motor control system 17 creates the drive current command Iref to send it to the power transistor 5. Thus, the motor 2 begins to run. After the beginning of running, the motor 2 is controlled using only the origin position data POS2 and POS3 according to the conventional technique, in the manner similar to that in FIG. 3.

In the embodiments described above, the respective system within the motor control device 1 are discrete components which are mutually coupled. However, those components may be integrated partially or completely so as to implement the same process therein. Various modifications may be considered by changing the arrangement of respective components. As to the position detecting method by the rotational position sensing system 9 and the origin position detecting system 13, various modifications may be considered if the same function is achieved. As to other components, many modifications may be considered if the same function is achieved. Moreover, in the present embodiments, the motor 2 is powered on at the beginning of operation, and the initial position of the motor 2 is detected only before the driving operation. If necessary, the modification may be considered that performs initial position detection by issuing the initial position detection command Mref every time the rotor 3 stops.

As described above, the motor control device according to the present invention can detect the initial position of the motor in which the magnetic reluctance of the rotor viewed from the stator depends on the rotational position of the rotor. Furthermore, since the motor is controlled by combining the initial position detection technique with the well-known position detection system, the initial position can be detected while precise control can be accomplished.

What is claimed is:

1. A motor control device, comprising:

an N-phase ac motor of which the magnetic reluctance of its rotor viewed from its stator depends on the rotational position of the rotor, first metering voltage signal generating means for sequentially creating an N-phase signal or a 2N p-phase signal, plural power transistors each for energizing with current and driving said motor and sequentially applying voltages to an N-phase stator winding according to an output signal from said first metering voltage generating means, current metering means for metering current flowing into said N-phase stator winding, and first rotational position arithmetic means for obtaining an absolute rotational position corresponding to an electrical angle of 180° based on each current measured by said current metering means.

2. A motor control device, comprising:

an N-phase ac motor of which the magnetic reluctance of its rotor viewed from its stator depends on the rotational position of the rotor, second metering voltage signal generating means for creating at least two reference voltage signals each having a constant period, plural power transistors each for energizing with current and driving said motor and sequentially applying voltages to an N-phase stator winding according to an output signal from said second metering voltage generating means, current metering means for metering current flowing into said N-phase stator winding, first rotational position arithmetic means for obtaining an absolute rotational position corresponding to an electrical angle of 360° based on each current measured by said current metering means, rotational position sensing means for incrementally measuring the rotational position of said motor, second rotational position arithmetic means for obtaining an absolute rotatinal position corresponding to an electrical angle of 180° based on an output signal from said first rotational position arithmetic means and an output signal from said rotational position sensing means, and first motor control means for initially controlling said motor based on the output signal of said first rotational position arithmetic means and then controlling said motor based on a high precision positional signal from said rotational position sensing means.

3. A motor control device, comprising:

an N-phase ac motor of which the magnetic reluctance of its rotor viewed from its stator depends on the rotational position of the rotor, second metering voltage signal generating means for creating at least two reference voltage signals each having a constant period, plural power transistors each for energizing with current and driving said motor and sequentially applying a voltage to an N-phase stator winding according to an output signal from said second metering voltage generating means, current metering means for metering current flowing into said N-phase stator winding, first rotational position arithmetic means for obtaining an absolute rotational position corresponding to an electrical angle of 360° based on each current measured by said current metering means, rotational position sensing means for incrementally measuring the rotational position of said rotor, origin detecting means for measuring the origin position of said rotor, second rotational position arithmetic means for obtaining an absolute rotatinal position corresponding to an electrical angle of 180° based on an output signal from said first rotational position arithmetic means and an output signal from said rotational position sensing means, and first motor control means for initially controlling said motor based on the output signal of said first rotational position arithmetic means and then controlling said motor based on a high precision positional signal from said rotational position sensing means and said origin detecting means.

4. A motor control device, comprising:

an N-phase ac motor of which the magnetic reluctance of its rotor viewed from its stator depends on the rotational position of the rotor, second metering voltage signal generating means for creating at least two reference voltage signals each having a constant period, plural power transistors each for sequentially applying voltages to N-phase stator winding according to an output signal from said second metering voltage generating means, current metering means for metering current flowing into said N-phase stator winding, first rotational position arithmetic means for obtaining an absolute rotational position corresponding to an electrical angle of 360° based on each current measured by said current metering means, rotational position sensing means for incrementally measuring the rotational position of said rotor, origin detecting means for measuring the origin position of said rotor, second rotational position arithmetic means for obtaining an absolute rotatinal position corresponding to an electrical angle of 180° based on an output signal from said first rotational position arithmetic means and an output signal from said rotational position sensing means, switching means for selectively changing connection between said motor and said plural power transistors, and second motor control means for initially controlling said motor based on the output signal of said first rotational position arithmetic means and then controlling said motor based on a high precision positional signal from said rotational position sensing means and said origin detecting means while switching said switching means.

* * * * *